Dec. 17, 1946.　　　　W. W. SLOANE　　　　2,412,755
SHUTTLE CAR
Filed Oct. 28, 1943　　　　3 Sheets-Sheet 1
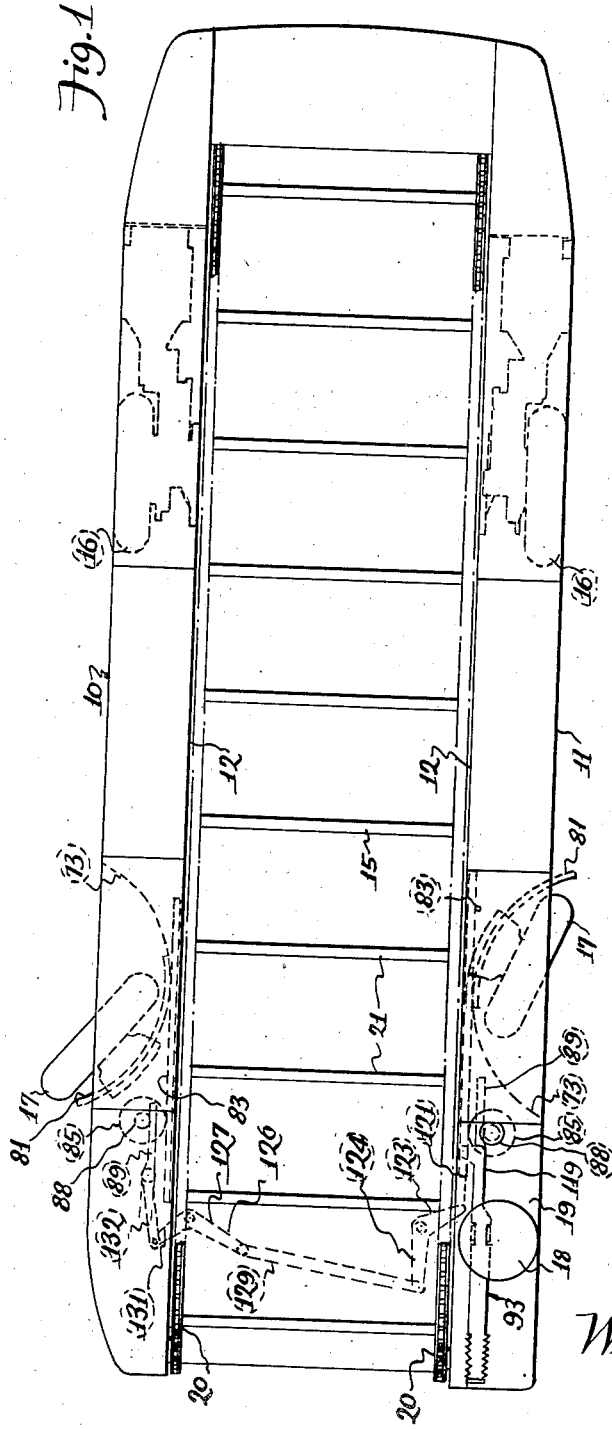
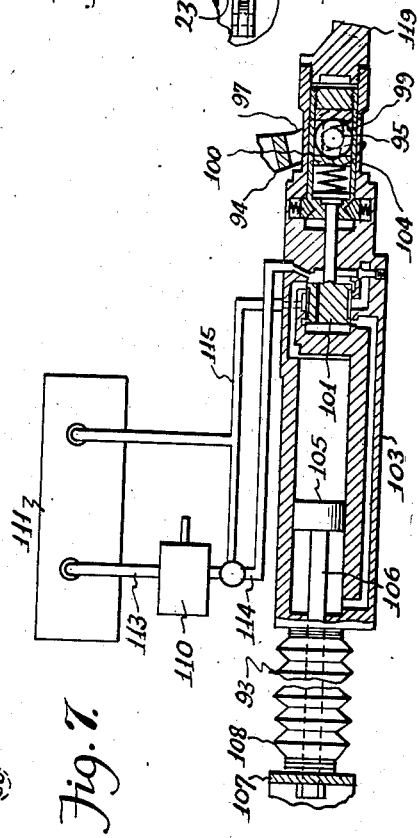
Inventor
William W. Sloane
Clarence F. Poole
Attorney

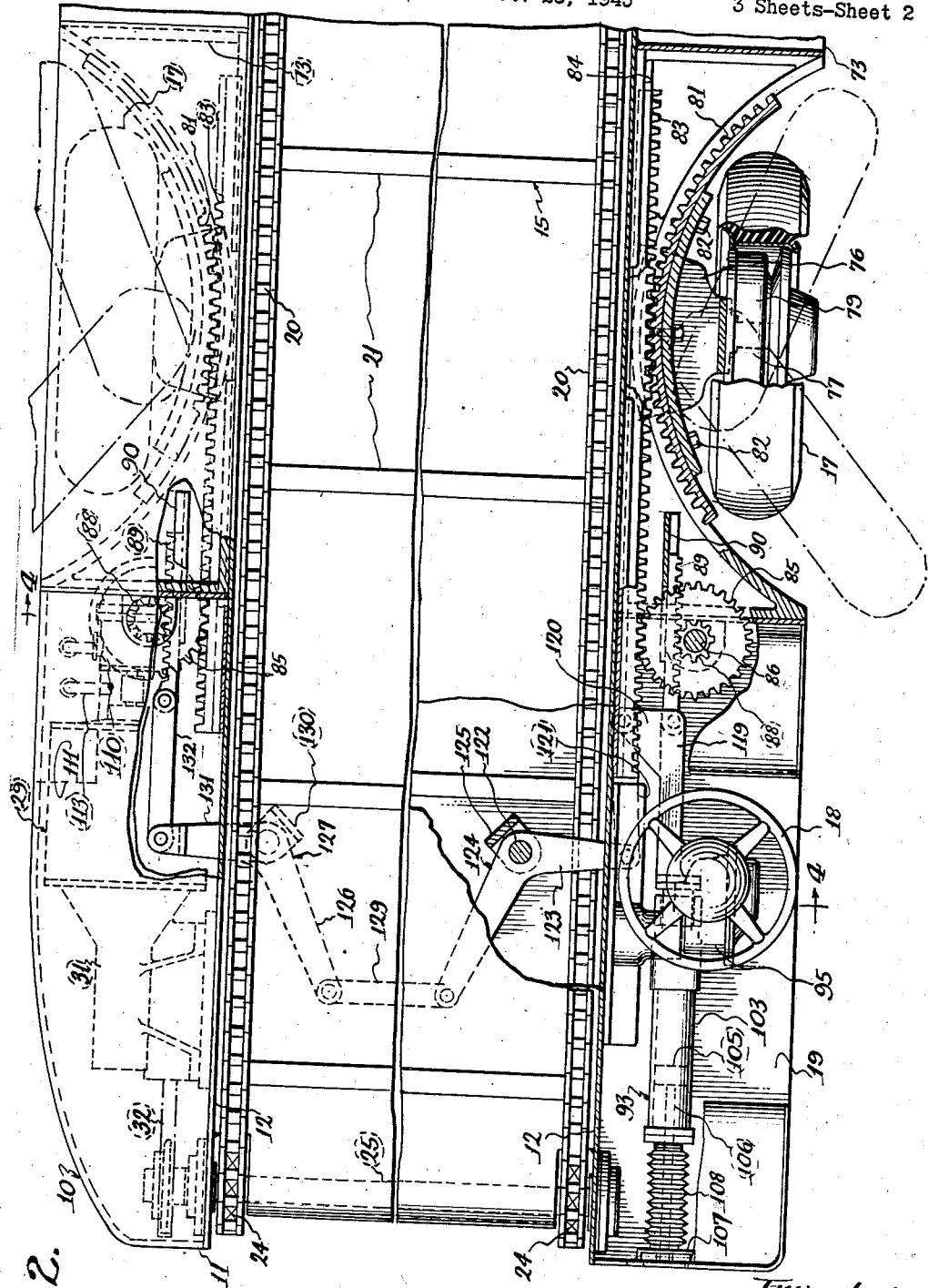

Dec. 17, 1946.   W. W. SLOANE   2,412,755
SHUTTLE CAR
Filed Oct. 28, 1943   3 Sheets-Sheet 3
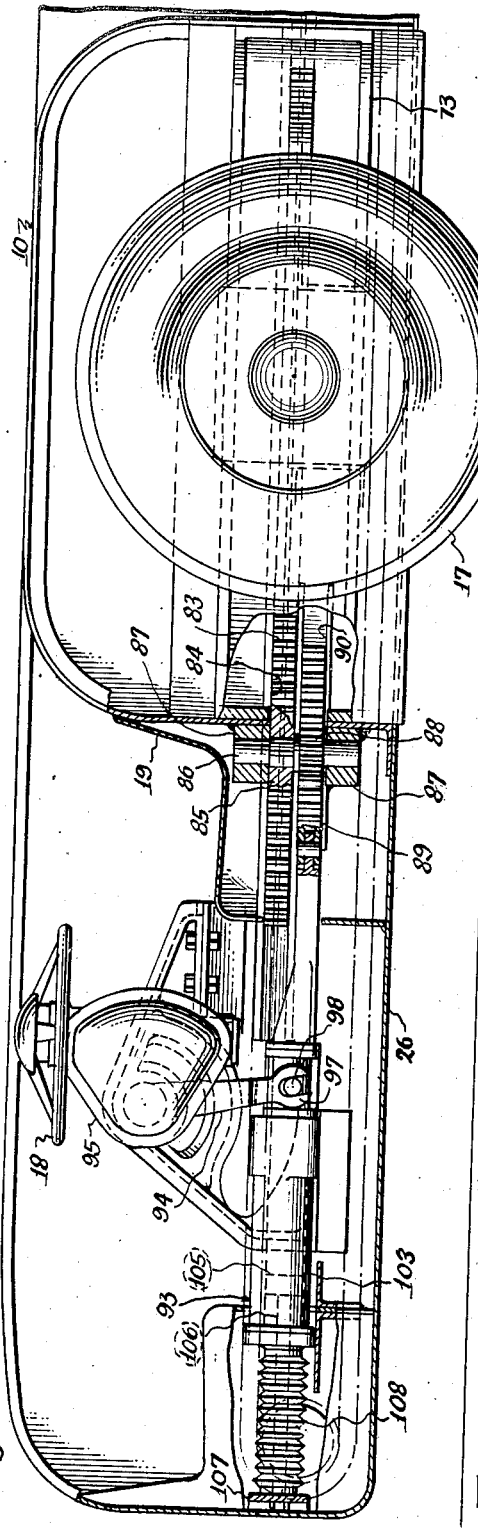
Fig. 3.
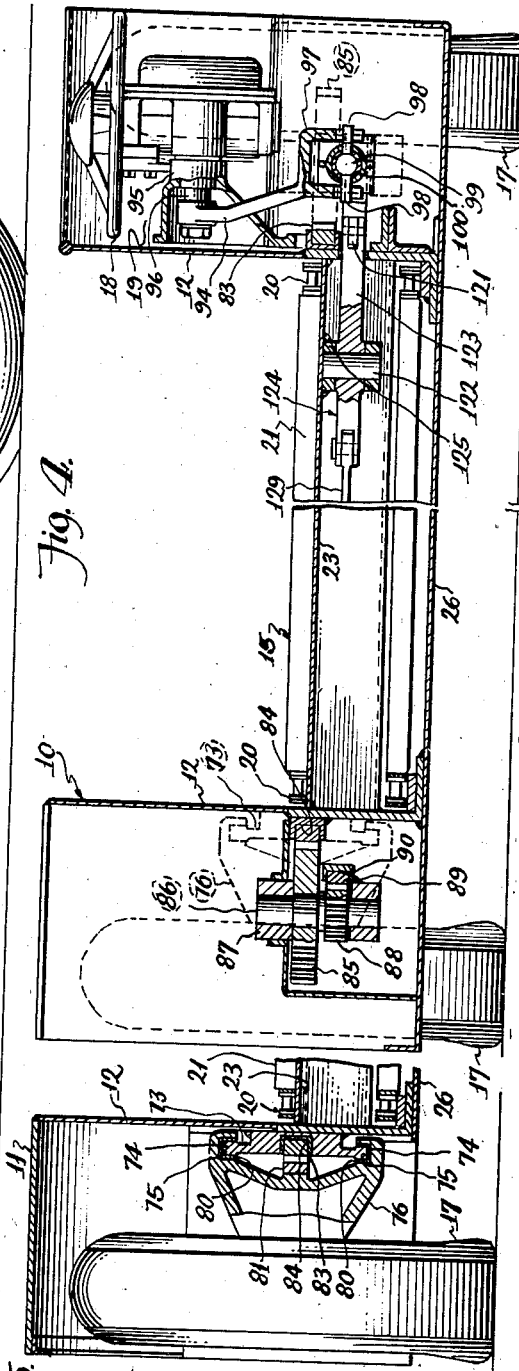
Fig. 4.
Fig. 5.
Inventor
William W. Sloane
Clarence F. Poole
Attorney Patented Dec. 17, 1946

2,412,755

UNITED STATES PATENT OFFICE 2,412,755

SHUTTLE CAR

William W. Sloane, Chicago, Ill., assignor to Goodman Manufacturing Company, Chicago, Ill., a corporation of Illinois Application October 28, 1943, Serial No. 507,928

5 Claims. (Cl. 280—87)

This invention relates to improvements in shuttle cars adapted to transport coal or other materials from working places of mines underground.

Shuttle cars operating in mines underground usually consist of a material carrying body supported on rear driving wheels and front steering wheels. The bottom of the material carrying compartment of the body is defined by a conveyor extending along the car quite close to the ground, and spaced a considerable distance below the axles of the steering and drive wheels. The steering wheels are mounted on Lemoine pivots in the usual manner, so the inner wheel turns sharper than the outer wheel. Since the wheels turn about axes spaced inwardly of the wheels, the major portions of the wheels turn into instead of away from the body during steering and thus restrict the width of the material carrying body of the car, recessed between the wheels. On account of space limitations underground, the capacity of a car is limited when using the conventional type of steering, and in mines of low head room has probably reached its maximum capacity.

The objects of my present invention are to provide a novel form of support and steering arrangement for the steering wheels of a shuttle car arranged to increase the capacity of the car over former shuttle cars, by making it possible to provide less clearance between the sides of the body of the car and the steering wheels thereof, so the width of the material carrying body of the car may be increased without increasing the overall dimensions of the car.

A more specific object of my invention is to provide a new and improved steering arrangement for a shuttle car including a mounting for the steering wheels, so arranged that the wheels will bodily turn about axes spaced outwardly from their outer sides, so that a greater part of the turning movement of the steering wheels will be in directions away from the sides of the car.

Other objects of my invention will appear from time to time as the following specification proceeds and with reference to the accompanying drawings wherein:

Figure 1 is a diagrammatic plan view of a shuttle car constructed in accordance with my invention;

Figure 2 is a fragmentary plan view of the front part of the car, with certain parts broken away and certain other parts shown in horizontal section, in order to illustrate certain details of the support for the front steering wheels, and the steering connections therefor;

Figure 3 is an enlarged fragmentary view in side elevation, with certain parts shown in longitudinal section, in order to illustrate certain details of the steering connections for the front steering wheels;

Figure 4 is a transverse sectional view taken substantially along line 4—4 of Figure 2;

Figure 5 is a fragmentary transverse sectional view drawn to the same scale as Figure 4, and showing certain details of the mounting for one of the front steering wheels on the body of the car;

Figure 6 is a fragmentary transverse sectional view illustrating certain details of the steering connections for one of the front steering wheels; and Figure 7 is a view diagrammatically illustrating the booster cylinder for steering, and the fluid connections thereto.

Referring now to the details of the embodiment of my invention illustrated in the drawings, a coal haulage vehicle or shuttle car is indicated generally by reference character 10. Said shuttle car consists of an elongated material carrying body 11 having a pair of vertically disposed laterally spaced side walls 12, 12 extending for its full length and forming the side walls of the material carrying compartment of the car. The bottom of the material carrying compartment of the car is defined by a conveyer indicated generally by reference character 15.

The material carrying body 11 is supported on two rubber-tired drive wheels 16, 16 near the rear of the car and two rubber-tired steering wheels 17, 17 near the front end of the car.

Steering is effected by a steering wheel 18 in an operator's compartment 19 near the front end of the car, to one side of the conveyer, in a manner which will hereinafter more clearly appear as this specification proceeds. The general construction and arrangement of said body is similar to that shown in application Serial No. 456,165, filed by William R. Beck on August 26, 1942, now Patent No. 2,336,386, so need not herein be shown or described in detail.

The conveyer 15 extends for substantially the full length of the vehicle so coal can be unloaded mechanically from one end thereof, and is herein shown as being an endless flight conveyer including a pair of parallel spaced endless chains 20, 20 having a plurality of parallel spaced flights 21, 21 mounted therebetween. Said endless chains and flights extend from idlers 22, 22 near the receiving end of the car along a bottom plate 23, connected between the side walls 12, 12 and forming a bottom for the conveyer, to and around drive sprockets 24, 24 on a transverse shaft 25 at the discharge end of the car. From thence said chains and flights extend beneath the plate 23 along a bottom plate 26, forming a bottom for the body of the car, to and around the idlers 22, 22.

The drive sprockets 24 and conveyer 15 are suitably driven by an electric motor 29, herein shown as being mounted on the outer side of the side wall 12 opposite from the operator's compartment 19. Said drive motor is suitably connected to said drive shaft through a worm and worm gear reduction (not shown), in a casing generally indicated by reference character 31 and a chain and sprocket drive 32, driven from the worm gear of said worm and worm gear reduction.

Referring now to the novel mounting for each front steering wheel, for supporting said steering wheels for steering movement about imaginary pivotal axes spaced laterally from their outer sides, so a greater part of the turning movement of said wheels will be away from the body of the car, when turning the car in either direction, each steering wheel 17 is slidably guided on a bracket member 73 for movement therealong. Said bracket members are secured to the outer sides of the side walls 12, 12 near the front end of the vehicle, and project laterally therefrom (see Figures 2 and 5). The mountings for each steering wheel and the steering connections therefor are the same, so the mounting and steering connection for one wheel only will herein be described. As herein shown, the bracket member 73 has a pair of vertically spaced oppositely facing horizontally extending arcuate guide portions 74, 74, which are of a convex formation when looking towards the side of the car. Said guide portions are adapted to be engaged by vertically spaced facing channelled guides 75, 75, formed integrally with a support bracket 76 for an axle 77 for the front steering wheel 17 (see Figure 5). Said front steering wheel may be of a construction somewhat similar to the rear drive wheel, and as herein shown, is provided with an internal brake drum 79 adapted to be engaged by the usual brake shoe (not shown).

The guide portions 74, 74 of the bracket member 73 and the channelled guides 75, 75 of the support bracket 76 are so formed as to slidably support the steering wheel 17 for movement about a pivotal axis spaced outwardly from the outside of the wheel, so that said wheel will move away from the body of the vehicle during the steering operation, instead of inwardly towards the body, as is usual in conventional forms of steering. Channelled bearings 80, 80 are interposed between the guide portions 74, 74 and the channelled guides 75, 75. Said bearings are herein shown as being plain bearings although it is obvious that other bearing means such as a plurality of spaced rollers may be substituted for said bearings, to reduce frictional resistance during steering, if desired.

The support bracket 76 is moved along the arcuate guide portion 74 of the bracket member 73 for turning the wheels during steering, by means of an arcuate rack 81 secured to the inside of the support bracket 76, as by cap screws 82, 82 (see Figure 2). Each arcuate rack 81 is meshed with a rectilinear rack 83, slidably guided in an outwardly facing channelled guide 84, formed in a bracket member 73, intermediate the upper and lower ends thereof. Said arcuate rack in turn is meshed with a spur gear 85 on a vertical shaft 86, journaled adjacent its upper and lower ends in a bracket 87, projecting forwardly from the forward end of the bracket member 73 (see Figures 3, 4 and 6). A spur pinion 88 is secured to said shaft, beneath the spur gear 85, and meshes with and is driven from a rectilinear rack 89, slidably guided in an outwardly facing channelled guide 90, herein shown as being formed integrally with the bracket member 73.

The racks 89, 89 are operated by the steering wheel 18 through a power steering booster indicated generally by reference character 93. Said power steering booster may be of a form well known to those skilled in the art and is no part of my present invention, so will only herein be described in so far as is necessary to make my present invention readily understandable. The steering wheel 17 has connection with an operating arm 94 of the steering mechanism through a worm and worm gear (not shown) enclosed in a housing 95. Said operating arm is mounted on a transverse shaft 96, journaled in the housing 95, and depends from said shaft and has a bifurcated lower end 97, having operative connection with said power steering booster 93, for operating said booster (see Figures 4 and 7). As herein shown, said bifurcated lower end of said arm has slidable connection with a pair of spaced studs 98, 98 projecting from opposite sides of a ball-shaped operating member 99. Said operating member is slidably mounted in a sleeve 100 and operates a valve 101, which controls the passage of fluid under pressure to the head and piston rod ends of a cylinder 103. Said valve and sleeve are herein shown as being slidably mounted in an integrally formed rearward extension 104 of said cylinder. A piston 105, in said cylinder, has a piston rod 106 projecting therefrom. Said piston rod is secured at its outer end to a member 107, secured to a forward end wall of the operator's compartment, so that the entire cylinder will move along said piston rod upon the admission of fluid under pressure to the head or piston rod ends of said cylinder. A boot 108, which may be made from leather or any other suitable material, encloses said piston rod end of the cylinder, to permit said piston rod to be lubricated and to prevent dust or dirt from accumulating on said piston rod.

Fluid is supplied to the cylinder 103 through the valve 101 by means of a pump 110. Said pump may be of any well known type and is herein shown as being driven from the rear end of the motor 29. A pipe 113 connects said pump with a fluid storage tank 111. A pipe 114 leads from said pump to said valve 101 in said cylinder. A return pipe 115 leads from said valve 101 to said fluid storage tank. Said valve is operated by the operating arm 94 and operating member 99, as has been mentioned before, and is arranged to supply fluid under pressure to either the head or piston rod ends of said cylinder, in a manner well known to those skilled in the art, upon the turning of the steering wheel in one direction or another.

An arm 119 is secured to and extends rearwardly from the rearward extension 104 of the cylinder 103. Said arm has the forward end of the rack 89 pivotally connected thereto, for slidably moving said rack in the guide 90. The arm 119 is provided with an inwardly extending portion 120, having a link 121 pivotally connected thereto. The opposite end of said link is pivotally connected to an arm 123 of a bell crank 124. Said bell crank, as herein shown, is pivotally mounted on a vertical pin 122, which is mounted on the underside of the plate 23 in a bifurcated bracket 125, secured to the bottom of said plate. The other arm of said bell crank is pivotally connected to an arm 126 of a bell crank 127 by means of a link 129. Said bell crank is mounted in a bracket H130, on the underside of the bottom plate 23, in a manner similar to the bell crank 124. Said last mentioned bell crank has an outwardly extending arm 131 which is connected with the righthand rack 89 by means of a link 132.

The arrangement of said links and racks and pinions is such that when the steering wheel 18 is turned in a direction to turn the vehicle to the right, fluid under pressure will be admitted to the piston rod end of the cylinder 103 through the valve 101, to move said cylinder and the left-hand rack 89 towards the rear of the vehicle and move the right-hand rack 89 towards the forward end of the vehicle through the bell cranks 124 and 127, to turn the two wheels in a common direction, but at different angles, so both wheels will positively turn the vehicle in the desired direction without skidding.

When it is desired to turn the vehicle in the opposite direction, fluid under pressure is admitted to the head end of the cylinder 103 by turning the steering wheel to the left. This positions the valve 101 to admit fluid under pressure to the piston rod end of the cylinder 103, and move said cylinder and the left-hand rack 89 towards the forward end of the vehicle, and move the right-hand rack 89 in an opposite direction, to turn the left-hand wheel at a sharper angle than the right-hand wheel, to compensate for the difference in radius of curvature of the path of travel of the two wheels.

It may be seen from the foregoing that the guide portions 74, 74 and guides 75, 75 are so arranged that the direction of turning of the steering wheels is outwardly from the body of the vehicles about arcs, the centers of which are spaced outwardly from the outsides of the wheels, and that this permits the side walls of the vehicle, recessed between the wheels, to be widened a distance equal to the space required for conventional steering where the pivots of the steering wheels are spaced inwardly of the insides of the wheels, without increasing the overall width of the vehicle.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a wheel mounted vehicle and in combination with a material carrying body having outer side walls and a pair of front steering wheels, axles for said wheels, means for mounting said wheels and axles on said side walls for bodily movement about imaginary upright pivots spaced outwardly from said side walls and the outer ends of said axles, so a major portion of said wheels will turn away from said body during steering, including arcuate supporting guides on opposite sides of said body and slidable supporting and guiding connections between said axles and said guides, spaced inwardly of said wheels, and means for turning said wheels during steering including racks guided for rectilinear movement along said side walls, means for rectilinearly moving said racks, and arcuate racks meshing with said rectilinearly movable racks and having operative connection with said axles for turning said axles about said imaginary pivots.

2. In a wheel mounted vehicle and in combination with a material carrying body having laterally spaced side walls with an endless conveyer mounted between said side walls and forming the bottom of the material carrying compartment of said body, a pair of steering wheels at opposite sides of said vehicle, axles for said wheels disposed a substantial distance above the lower end of said body, and mountings for said axles on said side walls for supporting said wheels for bodily movement about imaginary upright pivots spaced outwardly from said side walls and the outer ends of said axles, so a major portion of said wheels will turn away from said side walls during steering, said mountings each including a supporting member mounted on the outer side of one of said side walls, each of said supporting members having a pair of vertically spaced arcuate guiding portions, a bracket extending inwardly from each of said axles and having a pair of vertically spaced portions adapted to register for slidable engagement with upper and lower guide portions of one of said first mentioned guides, and means having operative connection with said axle brackets for moving said brackets along said guides, for steering the vehicle, including racks guided for rectilinear movement along the outer sides of said side walls, arcuate racks meshing with said racks and having operative connection with said axle brackets, and means for slidably moving said rectilinearly movable racks along said body for turning said axles and wheels.

3. In a wheel mounted vehicle and in combination with a material carrying body having outer side walls and a pair of front steering wheels, axles for said wheels, means for mounting said wheels and axles on said side walls for bodily movement about imaginary upright pivots spaced outwardly from said side walls and from the outer ends of said axles, so a major portion of said wheels will turn away from said body during steering, including arcuate supporting guides on opposite sides of said body and slidable supporting and guiding connections between said axles and said guides, spaced inwardly of said wheels, and interengaging means rectilinearly movable in opposite directions along opposite sides of said body and having operative connection with said axles for simultaneously moving said axles in opposite directions along said guides to turn said axles about said imaginary pivots, to steer the vehicle.

4. In a wheel mounted vehicle and in combination with a material carrying body having outer side walls and a pair of front steering wheels, axles for said wheels, means for mounting said wheels and axles on said side walls for bodily movement about imaginary upright pivots spaced outwardly from said side walls and from the outer ends of said axles, so a major portion of said wheels will turn away from said body during steering, including arcuate supporting guides on opposite sides of said body and slidable supporting and guiding connections between said axles and said guides, spaced inwardly of said wheels, and means for turning said wheels during steering including a member rectilinearly movable along each side of the body of the vehicle, an operative connection between each of said members and its respective axle for turning said axles about their imaginary pivots upon rectilinear movement of said members, a steering wheel for rectilinearly moving one of said members, and an operative connection between said rectilinearly movable members for rectilinearly moving the other member upon rectilinear movement of said one member in a direction opposite to the direction of movement of said one member, and moving said axles along said guides in opposite directions, for steering the vehicle.

5. In a wheel mounted vehicle and in combination with a material carrying body having outer side walls and a pair of front steering wheels, axles for said wheels, means for mounting said wheels and axles on said side walls, for bodily movement about imaginary upright pivots spaced outwardly from said side walls and the outer ends of said axles, so a major portion of said wheels will turn away from said body during steering, including arcuate supporting guides on opposite sides of said body and slidable supporting and guiding connections between said axles and said guides, spaced inwardly of said wheels, and means for turning said wheels during steering including a steering wheel, a rack, an operative connection between said steering wheel and said rack for rectilinearly moving said rack upon turning movement of said steering wheel, an interengaging connection between said rack and one of said axles for turning said axle upon movement of said rack, another rack on the opposite side of said body, an interengaging connection between said rack and said other axle for turning said axle upon rectilinear movement of said rack, and a connection between said racks operative to move said second mentioned rack in an opposite direction from said first mentioned rack upon turning of said steering wheel.

WILLIAM W. SLOANE.